UNITED STATES PATENT OFFICE.

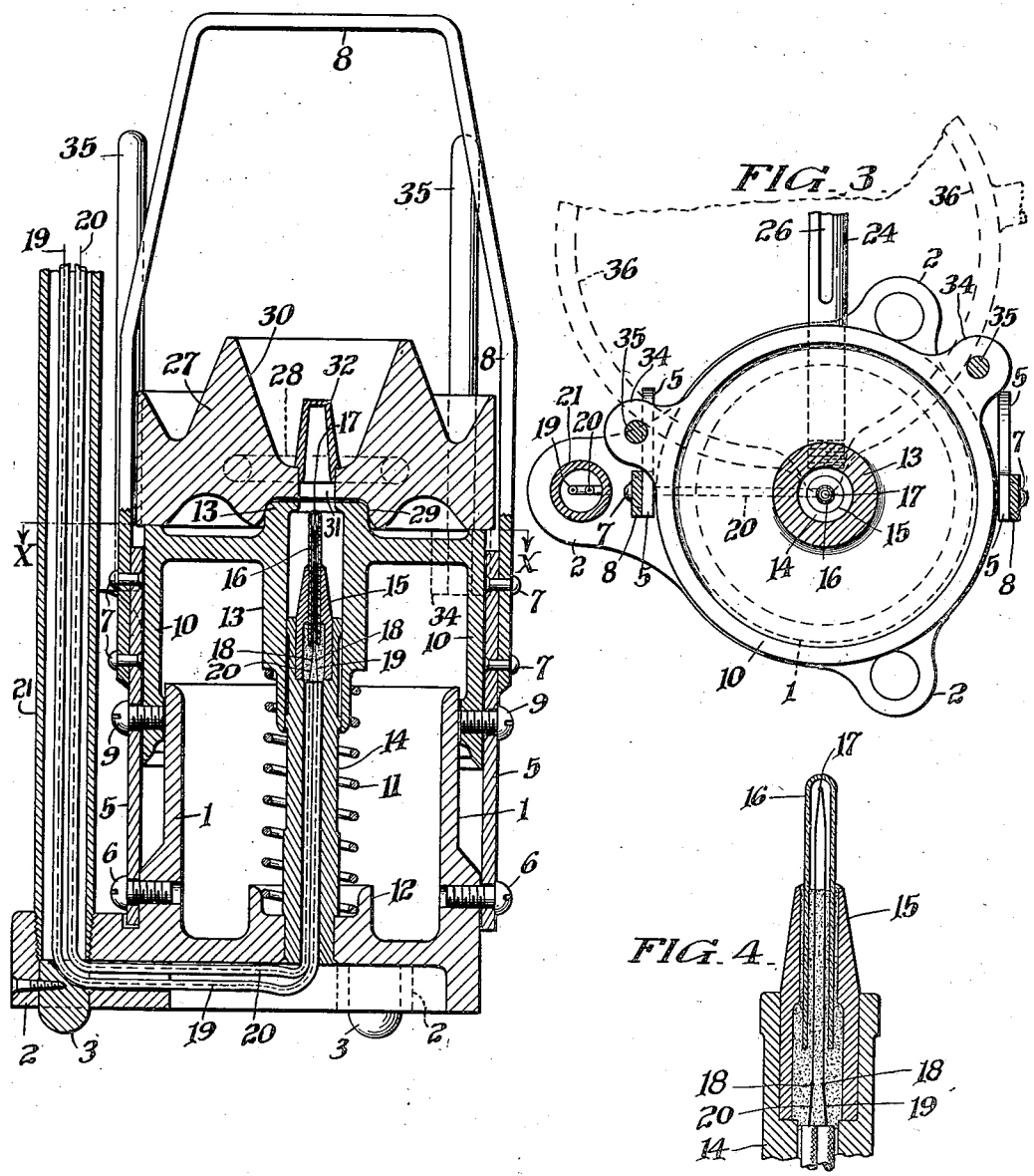

RICHARD C. DRINKER, OF BARNSTABLE, MASSACHUSETTS.

PYROMETRIC METHOD AND APPARATUS.

1,367,026. Specification of Letters Patent. Patented Feb. 1, 1921.

Application filed March 24, 1915, Serial No. 16,612. Renewed June 10, 1920. Serial No. 387,992.

*To all whom it may concern:*

Be it known that I, RICHARD C. DRINKER, a citizen of the United States, residing in the city of Barnstable, county of Barnstable, and State of Massachusetts, have invented new and useful Pyrometric Methods and Apparatus, of which the following is a specification.

My invention relates to apparatus for determining the temperature or condition dependent upon temperature of a material and particularly of molten steel or other metal or alloy.

My invention resides in pyrometric method and apparatus whereby the temperature or condition of a small mass or sample of molten metal or other material withdrawn from the main bath or mass of such metal or material may be determined, to thus determine the temperature or condition of the main bath or mass.

According to my invention the sample of material withdrawn is isolated in a container of definite or predetermined volume. A wall or part of the wall of the container is formed by a member of definite or predetermined dimensions and of any suitable material, so that said member determines the heat transfer between the cooling material in the receptacle and a heat responsive device, such member serving as a thermo-resistance of predetermined and preferably low magnitude.

The volume of the sample, as determined by the receptacle, is the same for each temperature measurement made, and upon it depends the calibration of the reading or indicating instruments associated with or controlled by the heat responsive device. And the member operating as a thermo-resistance coöperating with a definite or predetermined volume of the sample material determines the amount and rate of heat transfer from the sample to the heat responsive device. A greater or less volume of sample with a given thermo-resistance member would produce a greater or less effect upon the heat responsive device and thereby give an incorrect result.

According to my invention therefore, a sample of the material is isolated as a predetermined mass or volume, and while cooling, the ability of the sample due to its unknown temperature to pass heat through a definite or predetermined thermo-resistance is noted, preferably when the heat flow through the thermo-resistance has attained a maximum, and thereby the unknown temperature determined. In other words, the unknown temperature or thermo-potential is determined by noting the effect it can produce upon a heat responsive device through a thermo-resistance of definite or predetermined magnitude.

My invention resides in the method and apparatus hereinafter described and claimed.

For an illustration of one of the forms my invention may take reference is to be had in the accompanying drawings, in which:

Fig. 2 is a vertical sectional view, at right angles to Fig. 1, on larger scale, with the reading instrument omitted.

Fig. 3 is a horizontal sectional view taken on the line X—X of Fig. 2.

Fig. 4 is a fragmentary vertical sectional view on larger scale, of the thermo-junction and its inclosure.

Figure 1:
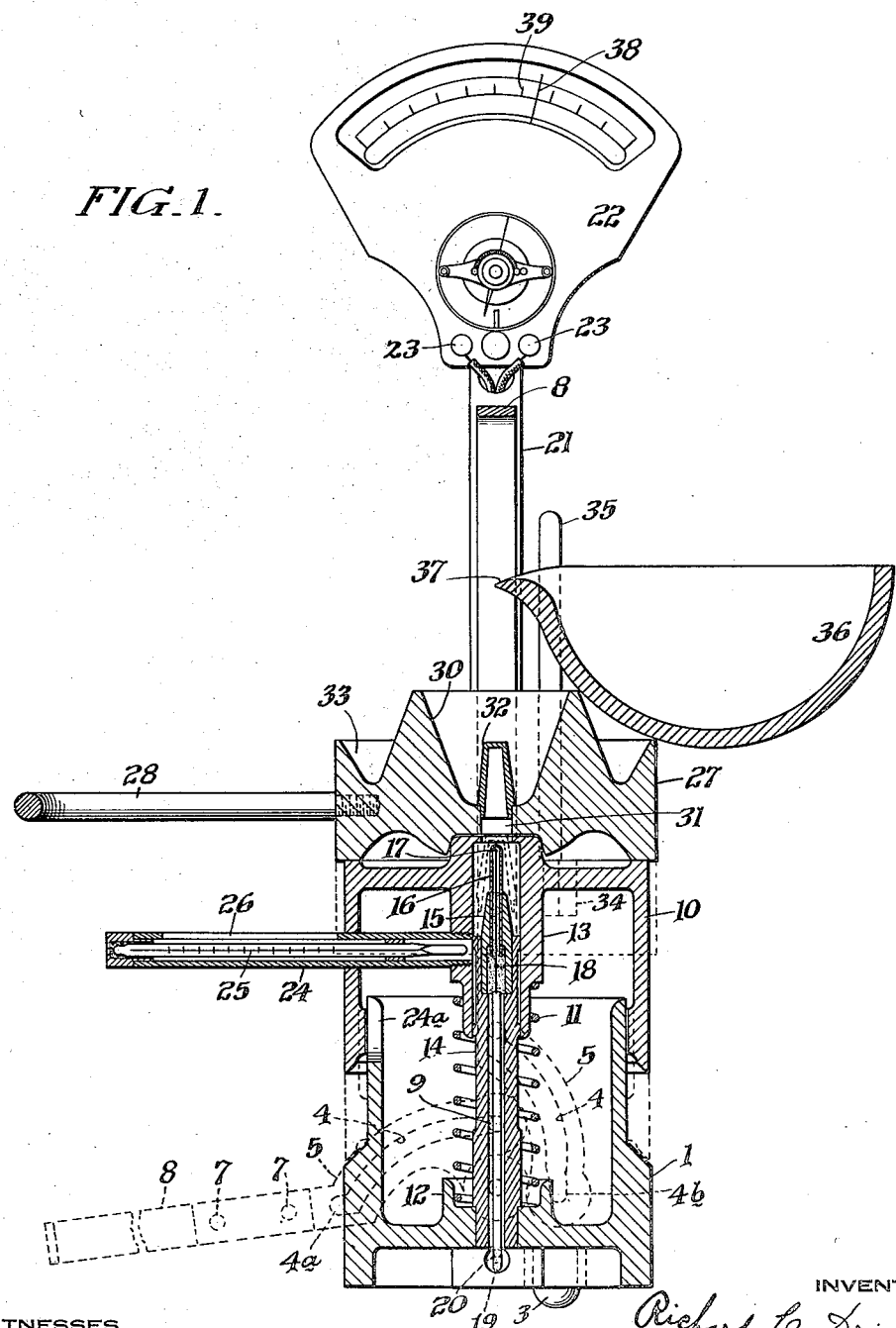
Figure 1 is a vertical sectional view, some parts in elevation, through apparatus embodying my invention.

In the drawings, 1 is a hollow metallic pedestal or base member having at its lower end the feet or lugs 2 provided with rubber, wood or other members 3 upon which the apparatus is adapted to rest upon a floor or other support.

Extending through slots 4 in the cam members 5 are the pivot screws 6 threaded into the member 1 at diametrically opposite points thereof. At their upper ends the cam members 5 are secured by rivets or screws 7 to the handle or bail 8. The cam slots 4 in the members 5, as indicated by dotted lines in Fig. 1, are of such shape that upon rotating the handle 8 in a counterclockwise direction as viewed in Fig. 1, to the dotted position indicated, the pivot screws 9, threaded into the member 10, are forced downwardly, forcing the member 10 to telescope upon the member 1 upon which member 10 is guided. During such movement the pivot screws 9, normally in the upper ends of the slots 4 pass to the lower ends of those slots. The upper end of each slot 4 is so shaped at 4ª as to lock the parts and the lower end of each slot is so shaped at 4ᵇ as to cause restraint upon the parts and yet to permit easy return of handle 8 to normal position. The compression spring 11ᶜ 11 is confined between the boss 12 on the member 1 and the boss 13 on the member 10, the spring 11 resisting the downward movement of the member 10 and to a greater or less extent counterbalancing the weight thereof and of the parts carried thereby.

Secured in the bottom of the member 1 and extending up therethrough and into boss 13 is the hollow metallic stem 14 having at its upper end an enlargement in which is secured the tubular member 15 within whose upper end is cemented or otherwise held the quartz or other refractory tube 16. Cemented or otherwise held within the tube 16 is a thermo-junction 17 which approaches but preferably does not touch the upper closed end of the tube 16. The thermo-junction may consist of wires or conductors of any suitable materials such as platinum and platinum-rhodium. At 18, particularly when the thermo-junction consists of noble metals such as named, the thermo-junction elements are connected to copper or other suitable wires or conductors 19 and 20 which with their insulation extend downwardly through the stem 14 thence across the bottom of the member 1 and thence upwardly through the tube or pipe 21 which may be screw threaded into one of the lugs 2 and which may carry on its upper end the reading instrument 22 to whose binding posts 23, 23 are connected the conductors 19 and 20. The instrument 22 is here illustrated as a galvanometer, as a milivoltmeter, though it will be understood that any other suitable instrument may be employed.

While I have shown the reading instrument mounted directly upon the apparatus, it will be understood that the conductors 19 and 20 may extend to a distance from the apparatus and there be connected to the reading instrument.

Extending through an aperture in the side of the member 10 and threaded into the boss 13 substantially opposite the cold junction 18 of the thermo-couple is a tube 24 within which may be inserted a thermometer 25 for determining the cold junction temperature. The thermometer scale may be viewed through a longitudinal slot 26 in the tube 24. The member 1 is slotted at 24ª to receive the tube 24 when the member 10 is depressed.

The member 27, of cast iron or other suitable material, preferably provided with the handle 28, is adapted to rest upon the top of the member 10, the upper end of the boss 13 and the registering depression 29 in the bottom of member 27 serving to center the member 27 upon the member 10. The member 27 has the cup or receptacle 30 formed therein. Communicating with the bottom of the cup 30 is the aperture or hole 31 in alinement with the tube 16. Into the upper end of the hole 31 is inserted the hollow conical member or capsule 32 closed at its upper end. The member 32 may be made of wrought iron or other material of good heat conductivity and of melting point preferably higher than the temperature of the sample metal poured into the cup 30. The member 27 is provided with a trough or channel 33 around the cup 30 to receive any overflow from the cup 30.

Upon the upper end of the member 10 are provided the lugs 34 into which are secured the vertically extending rods 35 serving as stops or guides for the ladle 36, whereby the pouring lip or spout 37 of the ladle will be properly positioned over the cup 30.

The ladle 30 may be of metal with a refractory lining and is provided with a handle, not shown.

The operation is as follows:

The apparatus is carried by the handle 8 to the hearth or furnace containing the molten metal whose temperature or condition is to be determined.

The operator then places the member 27 in position on the member 10, a new capsule or member 32 having been inserted in the cup 30. The handle 8 is then swung around to depress the members 10 and 27 to dotted line position indicated in Fig. 1, in which case the capsule 32 has been lowered over the tube 16 so that the upper end of the tube 16 projects well up into the inside of capsule 32.

The ladle 36 is plunged into the hearth or furnace and dips up therefrom a sample of molten metal, which will generally be covered with a mass of slag as the ladle is withdrawn, the slag floating on the sample in the ladle and covering the ladle serving to reduce heat transfer therefrom.

The ladle is withdrawn as quickly as possible from the hearth or furnace and placed as quickly as possible in the position indicated in Fig. 1 and the sample therein, quickly poured after perforation of slag at ladle spout into the cup 30, which has been previously lowered to bring the capsule or member 32 down over the tube 16 as above described.

Immediately the molten metal has been poured into the cup 30 the capsule 32 rises rapidly in temperature as does also the hot junction 17 of the thermo-couple, with the result that there is produced an electro-motive-force which causes the needle 38 of the reading instrument 22 to deflect over the scale 39. The movement of the needle 38 is observed and at the moment it reaches its maximum deflection the reading opposite the needle is taken on the scale 39.

The scale 39 may be calibrated in units of electro-motive-force or temperature. When calibrated in units of temperature the scale readings may be the temperatures of the hot junction 17 of the thermo-couple, in which case the scale readings will be lower than the actual temperature of the sample poured into the cup 32 and lower than the actual temperature of the molten metal in the hearth or furnace.

Or the markings on the scale 39 may be in temperature units which for any position of the needle 38 give a reading in temperature higher than the temperature of the hot junction 17, but equal to the temperature either of the metal poured into the cup 30 or the metal in the hearth or furnace; the excess in temperature above the actual temperature above the hot junction 17 being previously determined by any method or means.

Ordinarily, however, it will suffice to have markings on scale 39 which do not read either in units of temperature or electromotive-force, but which markings may be empirical only and determined experimentally, with the result that the needle 38 at its maximum deflection points to a scale marking which indicates that the metal in the furnace or hearth is either at the temperature desired, or at a higher or lower temperature.

In any event the instrument 22 informs the operator of the condition of the metal within the hearth or furnace, particularly as to its temperature or fluidity; the information given by the instrument 22 is therefore, that the metal in the furnace or hearth must be still further heated, or must be allowed to cool to a certain extent, or is just right for pouring.

After the reading has been taken, the handle 8 is returned to its normal position, thus in effect withdrawing the tube 16 into the shielding boss 13.

After the metal in the cup 30 has cooled or solidified it may be removed therefrom, the capsule or member 32 adhering to the sample and being removed therewith.

The capsules 32 may be accurately made, so that all shall have precisely the same dimensions, to the end that with each new capsule inserted in the member 27 the thermo-junction will be subjected to temperature which is a predetermined or definite portion or fraction of the temperature of the sample.

From the foregoing description it will be observed that heat of the sample is absorbed by a mass of definite or predetermined dimensions, and therefore of definite or predetermined heat absorption capacity, such mass 32 becoming then a secondary source of heat which by radiation affects a member or element of temperature measuring apparatus.

The capsule 32 or equivalent member thus serves as a thermo-resistance which restricts and determines the amount of heat which may be passed therethrough from the sample to the heat responsive device, the unknown temperature or thermo-potential being determined from the effect of the heat transmitted through the thermo-resistance 32 from a definite or predetermined volume of material.

What I claim is:

1. The method of determining the temperature of a mass of material, which consists in withdrawing therefrom a sample of predetermined volume, transmitting heat from said sample through thermo-resistance of predetermined magnitude, and making a measurement of heat transmitted through said resistance.

2. The method of determining the temperature of a mass of molten metal, which consists in withdrawing and isolating therefrom a sample of predetermined volume, allowing said sample to cool, while cooling transmitting heat from said sample through thermo-resistance of predetermined magnitude, and making a measurement of heat transmitted through said resistance when said transmitted heat attains a maximum.

3. The method of determining the temperature of a mass of material, which consists in withdrawing and isolating therefrom a sample of predetermined volume, transmitting heat from said sample through thermo-resistance of predetermined magnitude, subjecting a member to the heat so transmitted, and measuring the temperature of said member.

4. The method of determining the temperature or condition of a mass of molten material, which consists in withdrawing and isolating a sample therefrom, subjecting one side of a wall of predetermined heat conductivity to the heat of said sample, and measuring the maximum temperature attained on the other side of said wall during the cooling of said sample.

5. The method of determining the temperature or condition of a mass of molten material, which consists in withdrawing and isolating therefrom a sample of substantially definite volume, subjecting a member of predetermined heat absorption capacity to direct contact with said sample, radiating heat from the opposite side of said member, and measuring the intensity of such radiation.

6. The method of determining the temperature or condition of a mass of material, which consists in absorbing in a member of predetermined heat absorption capacity heat of a predetermined volume of said material, and measuring the intensity of radiation from said member.

7. In apparatus of the character described, a receptacle having an aperture extending through the wall thereof, a hollow member closing said aperture, the cavity within said hollow member communicating with said aperture, a member of temperature measuring apparatus, a support for said last named member, and means for moving said support with respect to said hollow member for introducing said last named member into said hollow member, said hollow member adapted to be completely submerged by material introduced into said receptacle.

8. In apparatus of the character described, a receptacle for an isolated sample of material of predetermined volume, a hollow member forming a wall of said receptacle and having predetermined dimensions for constituting said hollow member a thermo-resistance of predetermined magnitude, the interior of said hollow member communicating with the exterior of said receptacle, and a member of temperature measuring apparatus disposed within said hollow member, said hollow member being completely submerged by said sample.

9. In apparatus of the character described, a receptacle for an isolated sample of material of predetermined volume, a hollow member forming a wall of said receptacle and having predetermined dimensions for constituting said hollow member a thermo-resistance of predetermined magnitude, the interior of said hollow member communicating with the exterior of said receptacle, a member of temperature measuring apparatus disposed within said hollow member, said hollow member being completely submerged by said sample, a support for said member of temperature measuring apparatus, and means for moving said support with respect to said hollow member for introducing said member of temperature measuring apparatus into said hollow member.

10. In apparatus of the character described, a receptacle for an isolated sample of material of predetermined volume, a detachable hollow member forming a wall of said receptacle and having predetermined dimensions for constituting said hollow member a thermo-resistance of predetermined magnitude, the interior of said hollow member communicating with the exterior of said receptacle, and a member of temperature measuring apparatus disposed within said hollow member, said hollow member being completely submerged by said sample.

11. In apparatus of the character described, the combination with a base member, of a member of temperature measuring apparatus supported on said base member, a member movable with respect to said base member and having a bore in which said second named member is housed, said second named member projecting from said bore when said last named member is moved with respect to said base member.

12. In apparatus of the character described, the combination with a base member, of a member of temperature measuring apparatus supported on said base member, a member movable with respect to said base member and having a bore in which said second named member is housed, said second named member projecting from said bore when said last named member is moved with respect to said base member, and a cam member connecting said base member and said last named member for causing their relative movement.

13. In apparatus of the character described, the combination with a base member, of a member of temperature measuring apparatus supported on said base member, a member movable with respect to said base member and having a bore in which said second named member is housed, said second named member projecting from said bore when said last named member is moved with respect to said base member, a cam member connecting said base member and said last named member for causing their relative movement, and a bail attached to said cam member.

14. In apparatus of the character described, the combination with a base member, of a member of temperature measuring apparatus supported on said base member, a member movable with respect to said base member and having a bore in which said second named member is housed, said second named member projecting from said bore when said last named member is moved with respect to said base member, and a spring intervening between said base member and said last named member.

15. In apparatus of the character described, the combination with a base member, of a member of temperature measuring apparatus supported on said base member, a member movable with respect to said base member and having a bore in which said second named member is housed, said second named member projecting from said bore when said last named member is moved with respect to said base member, and a receptacle movable with said last named member and having a cavity into which said second named member is adapted to project.

16. In apparatus of the character described, the combination with a base member, of a thermo-junction supported thereon, and a member movable with respect to said base member and having a bore in which said thermo-junction is housed.

17. In apparatus of the character described, the combination with a base member, of a thermo-junction supported thereon, a member movable with respect to said base member and having a bore in which said thermo-junction is housed, and a reading instrument supported on said base member and electrically connected with said thermo-junction.

18. In apparatus of the character described, the combination with a base member, of a thermo-junction supported thereon, a member movable with respect to said base member and having a bore in which said thermo-junction is housed, and a receptacle movable with said member and having a cavity into which said thermo-junction is adapted to project.

19. In apparatus of the character described, the combination with a base, of a thermo-couple supported by said base, a member movable with respect to said base and having a bore in which a junction of said thermo-couple is housed, and means subjected to the temperature of the cold junction of said thermo-couple.

20. In apparatus of the character described, the combination with a base member, of a stem thereon, a thermo-junction supported on said stem and projecting beyond the end thereof, and a member movable with respect to said base member and having a bore into which said stem projects and in which said junction is housed.

21. In apparatus of the character described, the combination with a base member, of a stem thereon, a thermo-junction supported on said stem and projecting beyond the end thereof, a member movable with respect to said base member and having a bore into which said stem projects and in which said junction is housed, and a receptacle movable with said member and having a cavity into which said junction is adapted to project when said member is moved with respect to said base member.

22. In apparatus of the character described, the combination with a base, of a member of temperature measuring apparatus carried thereby, a second member movable with respect to said base, a receptacle member on said second member, and means on said second member for guiding a pouring ladle with respect to said receptacle member.

23. Pyrometric apparatus comprising a receptacle for an isolated sample of material of predetermined volume, a detachable member forming a wall of said receptacle, and heat responsive means disposed adjacent to and outside of said detachable member, said member having predetermined dimensions for constituting said member a thermo-resistance of predetermined magnitude.

24. Pyrometric apparatus comprising a receptacle open at its top and adapted to receive heated material, a detachable bottom member for said receptacle, and heat responsive means disposed adjacent to and outside of said bottom member, said bottom member having predetermined dimensions for determining the effect of heat of material within said receptacle upon said heat responsive means.

25. Pyrometric apparatus comprising a receptacle for an isolated sample of material of predetermined volume, a member forming a wall of said receptacle, and heat responsive means disposed adjacent to and outside of said member, said member having predetermined dimensions for constituting said member a thermo-resistance of predetermined magnitude.

26. Pyrometric apparatus comprising a receptacle open at its top and adapted to receive heated material, a hollow detachable bottom member for said receptacle, and heat responsive means disposed adjacent to and outside of said bottom member, said bottom member having predetermined dimensions for determining the effect of heat of material within said receptacle upon said heat responsive means.

27. Pyrometric apparatus comprising a receptacle, a detachable member forming a wall of said receptacle, a second member forming with said detachable member a substantially closed chamber, and heat responsive means disposed in said chamber, said detachable member having predetermined dimensions for determining heat transfer between material contained in said receptacle and said chamber.

28. Pyrometric apparatus comprising a receptacle, a member forming a wall of said receptacle, a second member forming with said member a substantially closed chamber, and heat responsive means disposed in said chamber, said first named member having predetermined dimensions for determining heat transfer between material contained in said receptacle and said chamber.

29. Pyrometric apparatus comprising a receptacle, a detachable member forming a wall of said receptacle, a support external to said wall, and a thermo-junction carried by said support, said detachable member having predetermined dimensions for determining heat transfer between material in said receptacle and said thermo-junction.

30. Pyrometric apparatus comprising a receptacle, a member forming a wall of said receptacle, a support external to said wall, and a thermo-junction carried by said support, said member having predetermined dimensions for determining heat transfer between material in said receptacle and said thermo-junction.

31. Pyrometric apparatus comprising a receptacle, a member forming a wall of said receptacle, a support external to said wall, a thermo-junction carried by said support, said member having predetermined dimensions for determining heat transfer between material in said receptacle and said thermo-junction, and a shield intervening between said member and said thermo-junction.

32. Pyrometric apparatus comprising a receptacle, a member forming a wall of said receptacle, a support external to said wall, a thermo-junction carried by said support, said member having predetermined dimensions for determining heat transfer between material in said receptacle and said thermo-junction, and a quartz shield intervening between said member and said thermo-junction.

33. Pyrometric apparatus comprising a receptacle isolating a predetermined volume of material, heat responsive means, a graduated reading instrument controlled by said heat responsive means, a wall of said receptacle adjacent said heat responsive means having thermo-characteristics upon which and upon said volume the readings of said instrument depend.

In testimony whereof I have hereunto affixed my signature this 19th day of March, 1915.

RICHARD C. DRINKER.